United States Patent [19]

Schmider

[11] 4,011,475
[45] Mar. 8, 1977

[54] TORQUE EQUALIZED BRUSHLESS PERMANENT MAGNET ROTOR MOTOR

[75] Inventor: Fritz Schmider, Hornberg, Germany

[73] Assignee: Papst-Motoren KG, Schwarzwald, Germany

[22] Filed: June 20, 1974

[21] Appl. No.: 481,563

[30] Foreign Application Priority Data

June 23, 1975 Germany .......................... 2332012
Nov. 21, 1973 Germany .......................... 2358030

[52] U.S. Cl. .......................... 310/68 R; 310/68 C; 310/156; 310/268; 318/254
[51] Int. Cl.² .......................... H02K 11/00
[58] Field of Search ............ 310/49, 191, 209, 268, 310/156, 68 A–68 D, 191–199; 318/138, 254

[56] References Cited

UNITED STATES PATENTS

| | | | |
|---|---|---|---|
| 2,610,993 | 9/1952 | Stark | 310/191 X |
| 3,315,106 | 4/1967 | Reynst | 310/191 X |
| 3,840,761 | 10/1974 | Muller | 310/268 X |
| 3,845,339 | 10/1974 | Merkle et al. | 310/156 |
| 3,891,905 | 6/1975 | Müller | 318/254 |
| 3,912,956 | 10/1975 | Müller | 310/68 C |
| 3,953,751 | 4/1976 | Merkle et al. | 310/268 X |

Primary Examiner—Donovan F. Duggan
Attorney, Agent, or Firm—Flynn & Frishauf

[57] ABSTRACT

To provide for even running and uniform torque output of pulse-energized motors, elements having soft-iron characteristics are located outside of the air gap, but within the stray, or leakage field emanating from the poles of a permanent magnet rotor, the elements being shaped and located with respect to the windings to exert a braking torque on the rotor when the rotor is in a position with respect to the coils of the motor for efficient energization of the coils, the magnet elements interacting with the field from the rotor during the gaps of energization to release the stored energy therein. The magnet elements may be yoke elements located adjacent, or outside of the air gap, soft-iron sheet metal strips, adjustably positioned on the stator, or the like.

38 Claims, 21 Drawing Figures

TORQUE EQUALIZED BRUSHLESS PERMANENT MAGNET ROTOR MOTOR

Cross reference to related U.S. Pat. Nos. 3,840,761; 3,873,897; 3,906,320, all assigned to the assignee of the present application.

The present invention relates to a torque compensated brushless d-c motor in which the field from a permanent magnet rotor interacts with an electrodynamic field, intermittently generated by armature coils, and more particularly to such a motor structure which is capable of storing, and then releasing magnetic energy to overcome the gaps in generated electrodynamic torque, so that the overall torque can be made to be substantially constant, or even.

In U.S. patent application Ser. No. 363,291, filed May 23, 1973 now U.S. Pat. No. 3,840,761 Muller, and assigned to the assignee of the present application, a brushless d-c motor is described in which soft iron elements are located on the stator in such a manner that the magnetic field of the rotor interacts with the magnetic elements on the stator, to provide a magnetic reluctance torque which changes in sign as a permanent magnet rotor approaches the magnetic elements, and then recedes therefrom upon rotation of the motor. The soft iron elements on the stator are so arranged that the magnetic reluctance torque has approximately opposite phase relationship to the a-c component of the electrodynamic torque, derived by energization of the armature, or stator windings, when resolving the electrodynamic torque pulses in accordance with the principles of Fourier analysis. The structure disclosed in the aforementioned application substantially simplifies the construction of brushless d-c motors, and the associated circuits therefore. For example, a motor previously disclosed in the Siemens-Zeitschrift (Siemens Journal) Volume of 1966, Pages 690–693 requires four separately controlled coils in order to generate a rotating field. To control current through the coils, two Hall generators, and at least four transistors are used. The various circuit elements which may be used in connection with a possible speed control circuit are not even considered therein. In accordance with the invention of the aforementioned Ser. No. 363,291, the motor needs only two coils, and a single Hall generator, and two power transistors. It is thus possible to construct such motors at a much lower price than heretofore possible.

Various motor drives require prime movers, or motors, in which the cost of the motor itself is a limiting factor. It is thus necessary to simplify the construction of such motors as far as possible.

It is an object of the present invention to simplify the construction of motors utilizing the principle disclosed in the aforementioned Ser. No. 363,291 so that the price of the motor can be reduced.

SUBJECT MATTER OF THE PRESENT INVENTION

Briefly, the soft iron element which stores magnetic energy during the time that electrodynamic energy is provided to the motor, for subsequent release during gaps of energization, is arranged on the stator in such a manner that at least a portion of its volume is located outside of the air gap, that is, outside of the direct or main magnetic circuit of the motor, but within the stray, or leakage field of the permanent magnet rotor. This construction permits simple spacial arrangement, and simple manufacture and adjustment, since adjustment on elements located only within the stray, or leakage field from this rotor may be made after the motor has been built, and is otherwise finished and ready for shipment. Surprisingly, it has been found that utilizing the stray or leakage flux does not decrease the field from the magnet of the rotor in the air gap of the motor, so that the rotor magnet need not be made stronger, or given different dimensions than the motor without such additional soft iron elements in the leakage, or stray field. Several such soft iron elements may be so located on the rotor, symmetrically thereto, that the magnetic forces acting thereon, due to the flux from the rotor, approximately cancel each other, so that additional loading of the bearings of the motor is avoided. This further simplifies the construction of the motor. Such arrangements which do not additionally load the bearings are particularly important for simple and inexpensive motor constructions. It is also possible to utilize the soft iron elements as a portion of the motor structure itself, which opens up additional possibilities to vary the structural arrangements of the various parts of the motor.

In accordance with an aspect of the invention, which is particularly advantageous, a soft iron element is provided which extends beyond one pole sub-division of the permanent magnet rotor, or over a plurality of such pole subdivisions. Preferably, the iron element may be formed as a closed loop, or as a bail, or strip, so placed that at least the ends thereof are in the stray magnetic field from the permanent magnet rotor, and to interact therewith. Relatively large reluctance torque can be generated with motors which are so arranged; these particular structural arrangements permit the assembly of compact, small motors having a high starting and driving torque, by utilizing the stray leakage field from the rotor thereof.

A combination of the concepts of the present invention, and that specifically disclosed in the aforementioned application if of course possible, that is, locating soft iron elements in the air gap as well as in the leakage field from the rotor, for example in order to obtain a particular time distribution of the reluctance torque which, as explained in the aformentioned application, is practically the mirror image of the alternating component of the drive torque, when analyzed in accordance with the principles of Fourier analysis.

The invention will be described by way of example with reference to the accompanying drawings, wherein.

Figure 1:
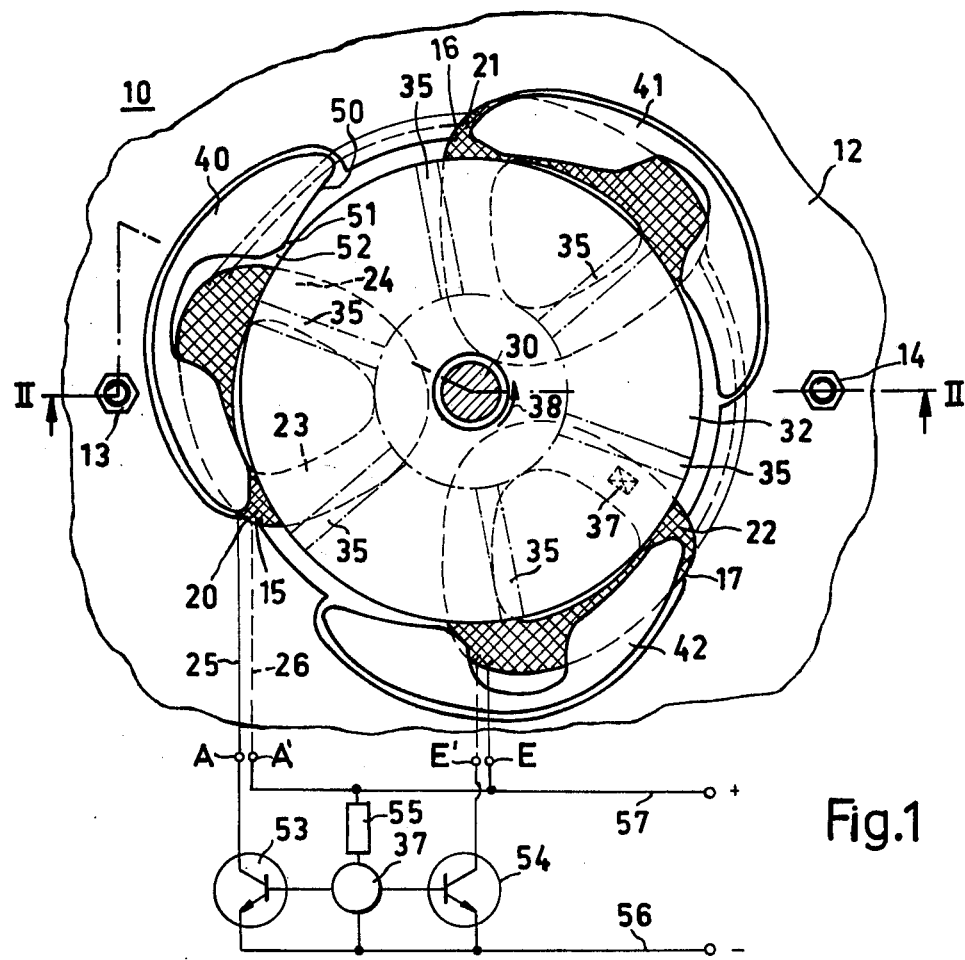
FIG. 1 is a cross sectional view through line I—I in FIG. 2, of an embodiment of the d-c motor.
Figure 2:
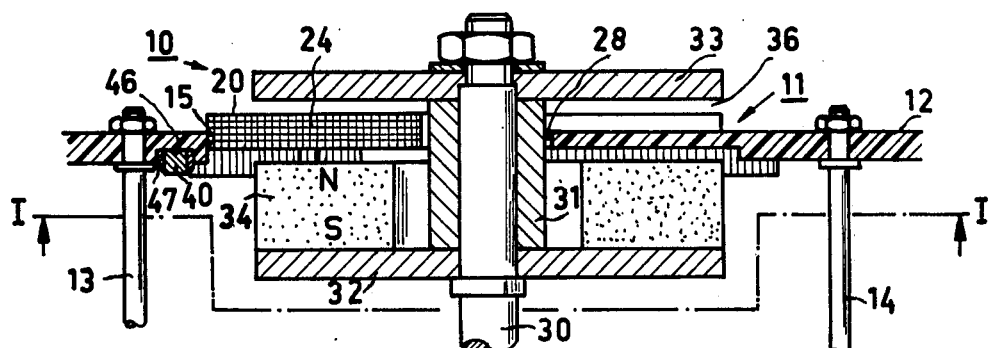
FIG. 2 is a cross sectional view taken along the broken, angled section line II—II of FIG. 1, in which the left side of the line (with respect to the axis of the motor) extends through a stator coil and the right side extends between stator coils.
Figure 7:
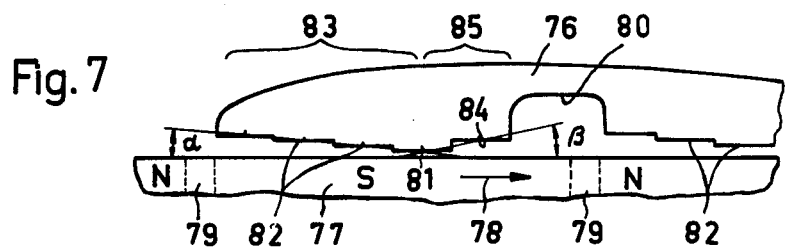
Figure 7A:
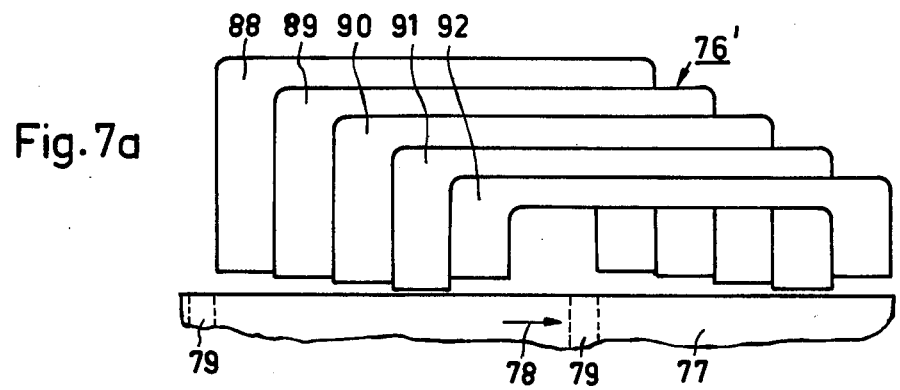
Figure 8:
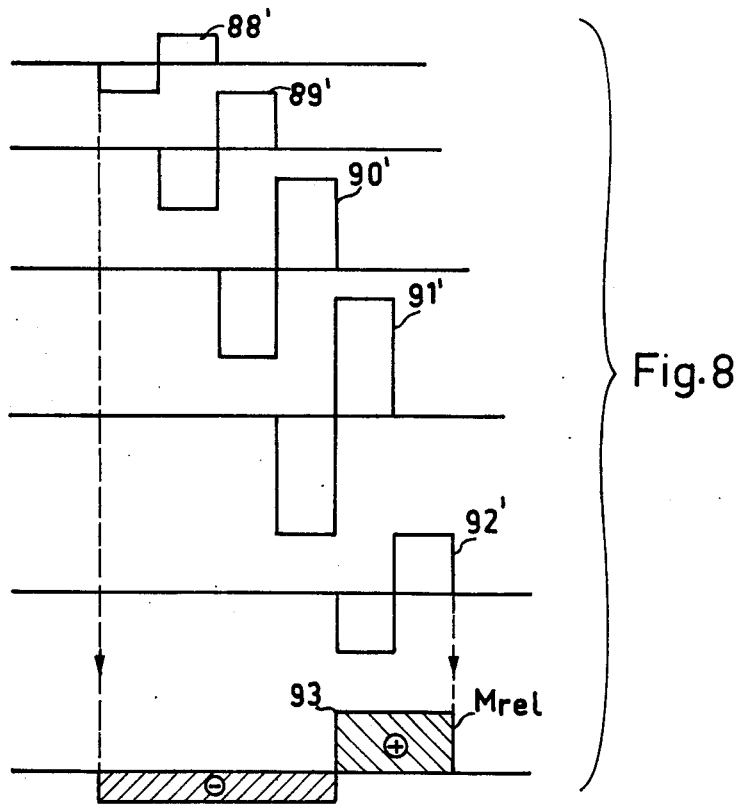
Figures 9, 10:
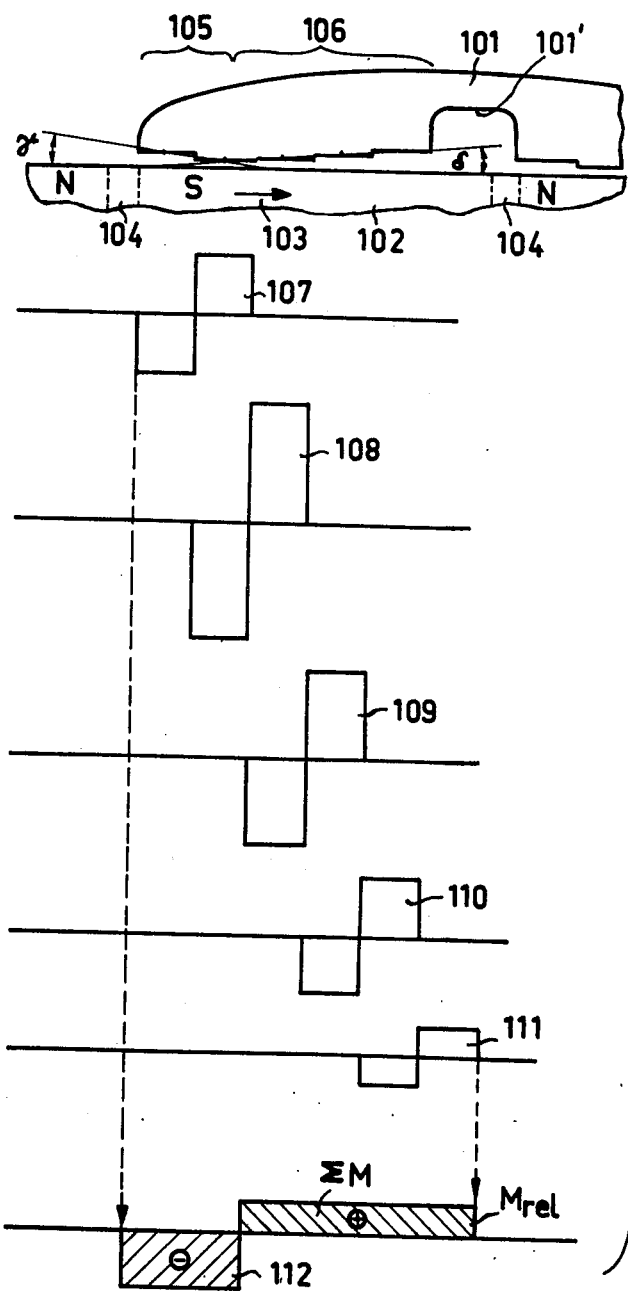
Figure 11:
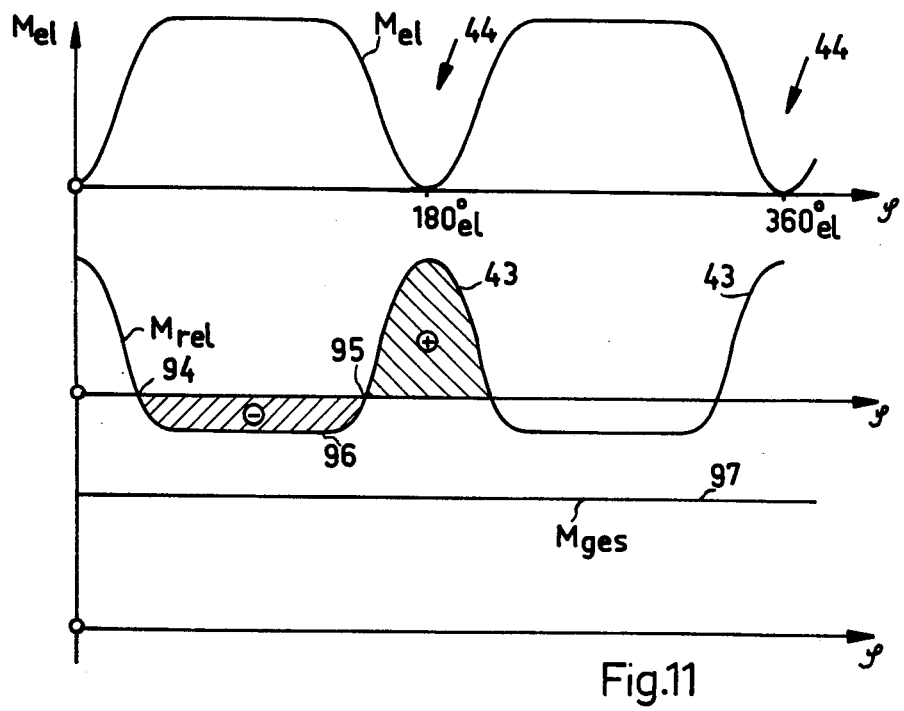
Figure 12:
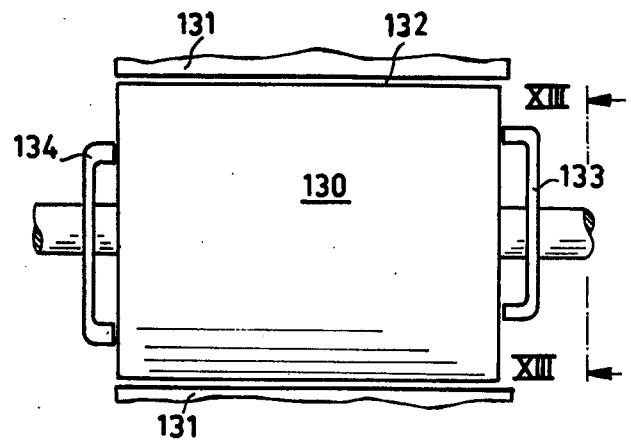
Figure 13:
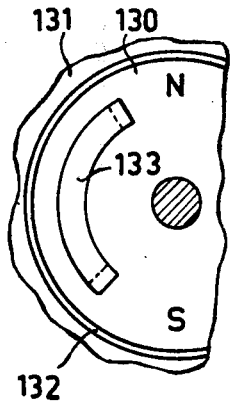
Figure 14:
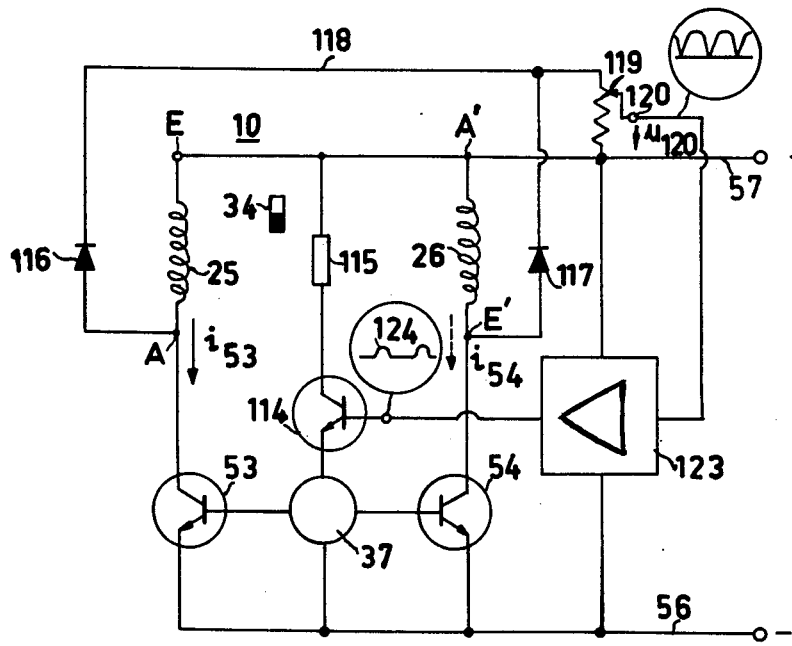
Figure 15:
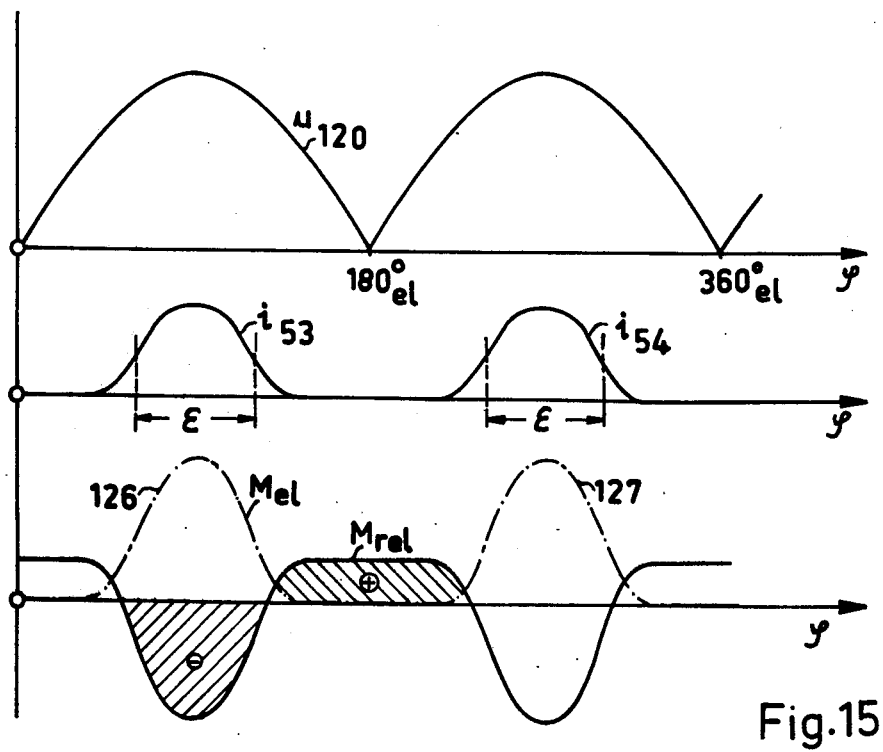
Figure 16:
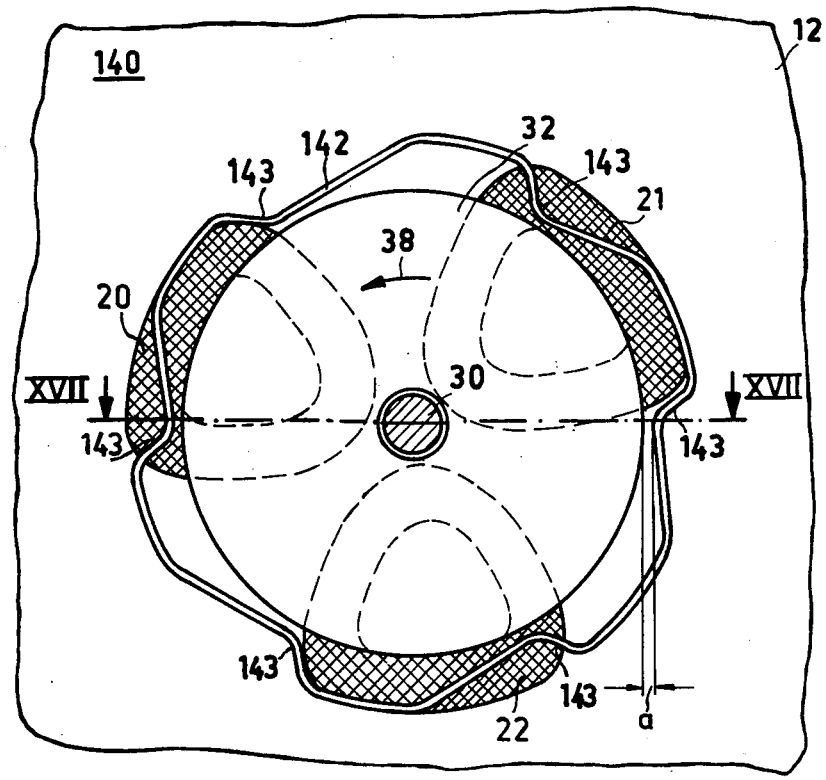
Figure 17:
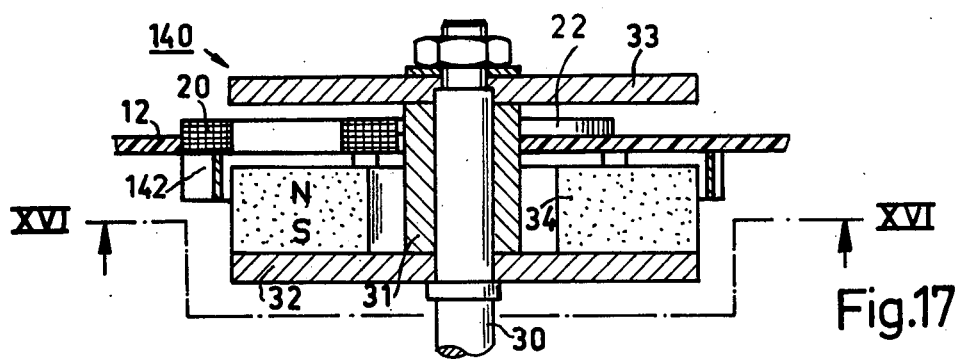
Figure 18:
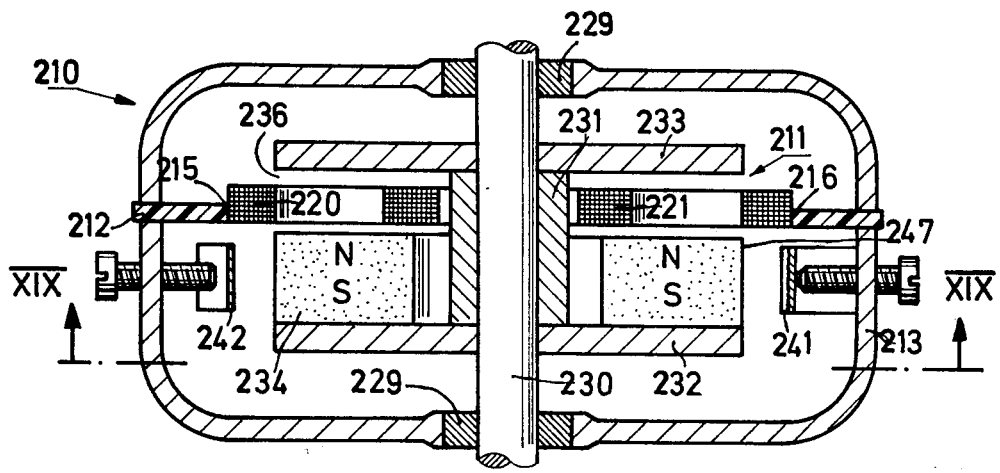
Figure 19:
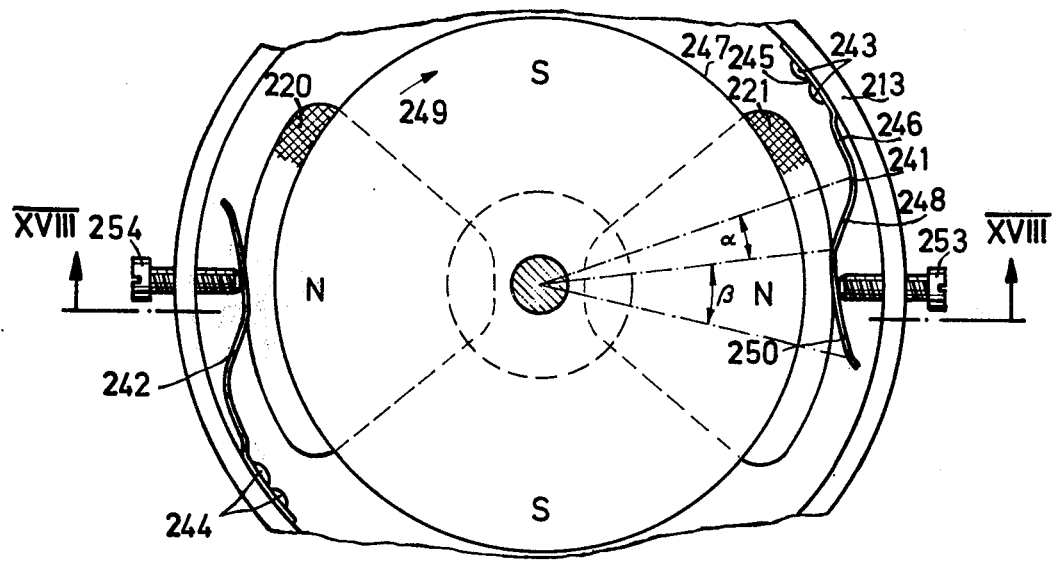

FIGS. 3, 4, 5, and 6, are graphs used in connection with an explanation of the operation of the motor;

FIG. 7 is a schematic developed view of a rotor and a soft iron element in magnetic interacting relationship with the rotor field;

FIG. 7a, illustrates a modification of the embodiment of FIG. 7;

FIG. 8, in lines a–f is a series of graphs illustrating the operation of the embodiment in accordance with FIG. 7, or FIG. 7a, respectively;

FIG. 9 is a developed view of a rotor and another embodiment of a soft iron element in magnetic circuit relationship with the field from the rotor;

FIG. 10, in lines a–f is a series of graphs used in connection with the explanation of the operation of the motor using the soft iron element of FIG. 9;

FIG. 11, in lines a–c is a series of graphs used in connection with the operation of the motor of FIGS. 1 and 2;

FIG. 12 is a schematic longitudinal cross sectional view through a radial, cylindrical air gap, internal rotor motor utilizing the principles of the present invention;

FIG. 13 is a fragmentary sectional view along line XIII—XIII of FIG. 12;

FIG. 14 is a schematic simplified circuit diagram of a speed controller useful in connection with a motor of the present invention;

FIG. 15, in lines a–c shows a series of graphs used to illustrate the operation of the motor of FIG. 14;

FIG. 16, is a schematic cross sectional view taken along line XVI—XVI of FIG. 17 and illustrating another embodiment of the motor in accordance with the present invention;

FIG. 17, is a longitudinal cross sectional view along line XVII—XVII of FIG. 16;

FIG. 18, is a longitudinal cross sectional view through a further embodiment of a brushless d-c motor taken along line XVIII—XVIII of FIG. 19;

FIG. 19, is a sectional view along line XIX—XIX of FIG. 18; and

Figure 20:
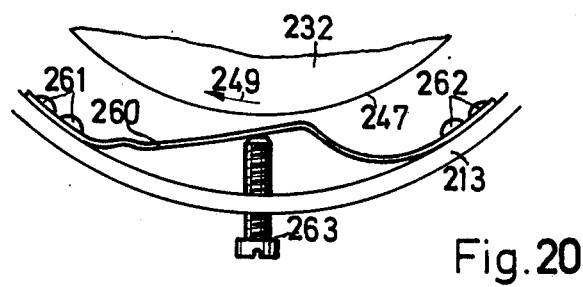

FIG. 20 is a fragmentary sectional view illustrating a modified embodiment of a soft iron strip, and the adjustment therefore, similar to one outer portion illustrated in FIG. 19.

Similar elements, and elements operating similarly have been given the same reference numerals and will be described but once.

A six-pole brushless d-c motor 10 (FIG. 1) has a stator 11 secured to an insulating plate 12. Plate 12 may be secured by means of suitable standoff supports 13, 14, to a device carrying the element to be driven by the motor. Plate 12 includes a printed circuit (not shown thereon) which may include all the electronic circuit components to control motor operation. It is formed with three openings 15, 16, 17 in which three bifilar flat coils 20, 21, 22 are, respectively, secured, for example by means of adhesives. The magnetically active sections of coils extend, as shown, practically radially. These sections are indicated at 23, 24 with respect to coil 20. These three coils are offset mechanically by 120°, corresponding to 360°, electrically, with respect to each other. They are series connected, as shown, so that a bifilar winding is obtained, having terminal ends A and E for one continuous conductor 25, shown in solid lines in FIG. 1, and having terminals A' and E' for the conductor 26, shown in broken lines in Fig. 1. The conductor filament 25 of the bifilar winding is used for current flow in one direction; the conductor or filament 26 of the bifilar winding is used for current flow in the other direction.

Figure 3:
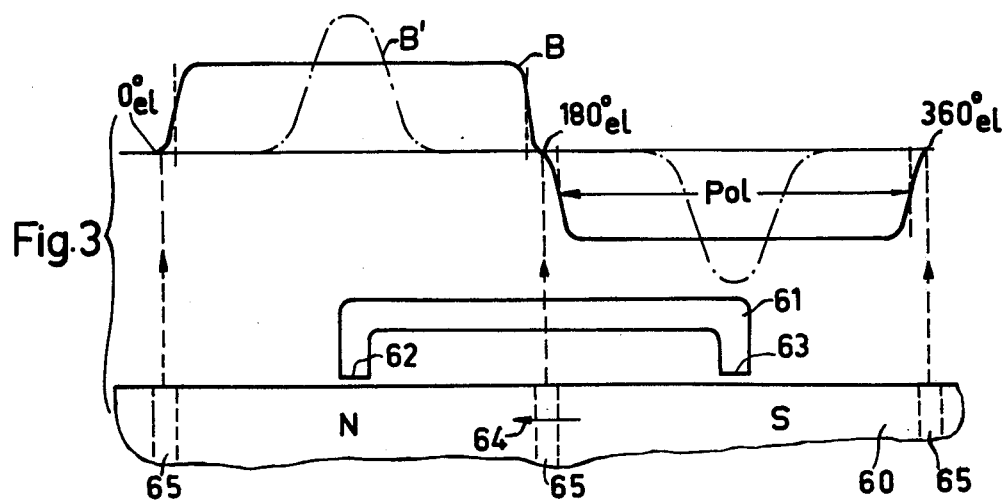
Figure 4:
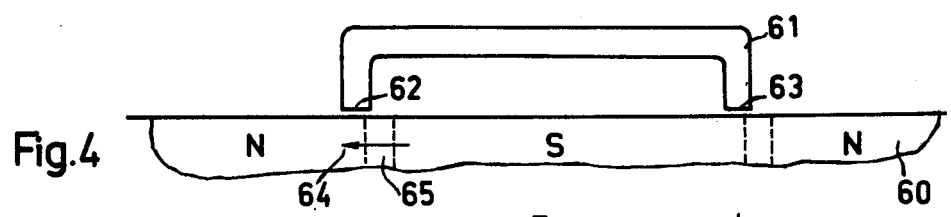

The plate 12 has a central hole 28 through which a shaft 30 passes which is journalled in bearings, not shown, for example located on the apparatus having the rotary element to be driven. As seen in FIG. 2, two soft iron discs 32, 33 are secured to the shaft 30, spaced from each other by a spacer sleeve 31. A six-pole axially polarized ring magnet 34 is adhesively secured to the lower disc 32. The pole gaps 35 extend radially, as seen in FIG. 1, in chain dotted lines. The ring magnet 34 preferably is a sinter magnet which is, considered circumferentially, essentially trapezoidally magnetized, that is, has a distribution of magnetization which is shown in FIG. 3, graph a, curve B. Disc 33 is provided to close the magnetic circuit. It may, also, carry a ring magnet similar to magnet 34, if the air gap 36 requires a stronger field (see, for example, the description of the aforementioned application Ser. No. 363,291).

A galvanometric commutation element 37, for example a Hall generator, is located on coil 22 in the air gap 36 of the motor 10. The position of the rotor in FIG. 1 is at rest, in one of six possible stable equilibrium positions. Hall generator 37 is located close to, but not within a pole gap 35, that is, in the region of a pole of the rotor. When the motor starts, rotating in the direction of the arrow 38 (FIG. 1) the Hall generator 37 will be within the range of the magnetic field from a pole of the rotor for a substantial portion of the circumference thereof.

Three soft iron elements 40, 41, 42 are located on the stator, circumferentially with respect to the rotor 34. These soft iron elements generate the reluctance torque $M_{rel}$, illustrated in FIG. 11. This reluctance torque is, ideally, the mirror image of the electrodynamic drive torque $M_{el}$ (FIG. 11) and is so arranged that its drive portions 43 span the torque gaps 44.

The soft iron elements 40–42 are soft iron yokes extending over a pole gap, that is, approximately 180° electrical; as seen in FIGS. 16 and 17, however, they may extend over a wider angle. These yokes are inserted in suitable openings 46 formed in plate 12, which are big enough so that the yokes can be moved radially, that is, that they have radial play. The yokes are then placed in a predetermined distance from the sleeve 31, that is, from the axis of the motor by means of suitable jigs, and then fixed in the opening 46 by a suitable adhesive 47 (for example apoxy compounds), as seen in FIG. 2. This permits simple, efficient assembly.

The ends of the yokes 40, 41, 42 are tapered. In the example shown, the distance between the ends of the yokes and the ring magnet 34 — looked at in the direction of rotation, decreases in a first range 50 (FIG. 1) to a minimum 51, and then rapidly increases in a second range or zone 52. This construction is designed for a motor which has relatively short gaps between pulses passed through the coils, so that only relatively short gaps in the electrodynamic torque need be bridged, that is, the gaps 44 (FIG. 11) are comparatively narrow. If the gaps in energization are wider, the range 52 must become longer and the range 50 is then correspondingly shortened, which will be explained in detail below.

The main electronic switching components to control current flow through the winding conductors are also shown in FIG. 1. Two transistors 53, 54 have their emitter-collector paths connected to terminals A, and E', respectively, and to a negative bus 56 of a d-c supply source (not shown). The Hall generator 37 has its power connection likewise connected to bus 56 and through a resistor 55 to a positive bus 57 connected to the source of the d-c supply. The other terminals, A' and E, respectively, of the winding conductors are also connected to bus 57. The control outputs of the Hall generator 37 are connected to the bases of the transistors 53, 54.

Operation of electrical circuit: Let it be assumed that transistor 54 is controlled to be conductive. Current will flow through the three coils 20, 21, 22 in clockwise direction. If transistor 53 is controlled to be conductive, current will flow through coils 21, 22, 23 in counter-clockwise direction. Commutation of current flow is effected by the Hall generator 37, so that the aforementioned electrodynamic drive torque $M_{el}$ (FIG. 11) is obtained which, during commutation, shows gaps 43. These gaps, in operation of the motor, cause oscillatory swings, that is, superimposed oscillatory positive and negative torques which, then, prevent use of such a motor in many applications, for example in applications which require a substantially constant or even supply torque.

Motor operation, with reference to FIGS. 3–6: FIG. 3, graph b shows a developed section 60 of the rotor which, for example, is polarized perpendicularly to the plane of the drawing. A U-shaped yoke 61 is located on the stator (or, secured to the structure with which the motor is used, so that it is stationary with respect to the rotor), the yoke 61 extending over the length of a pole, from pole gap to pole gap. The two ends 62, 63 of the yoke 61 are in magnetic circuit relationship with the stray field from the rotor. The rotor moves in the direction of the arrow 64. The pole gaps of the rotor, between poles N and S are shown at 65. Graph (a) of FIG. 3 illustrates the trapezoidal magnetization B of the rotor 60.

Figure 6:
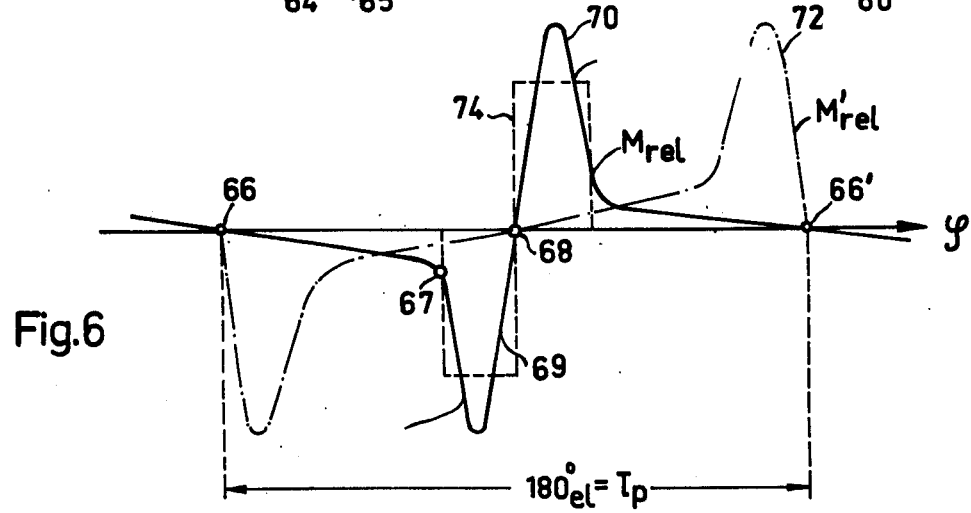

As can be immediately seen, rotor 60 has the tendency to assume the stable equilibrium position illustrated in FIG. 3, graph b, in which the ends 62, 63 of yoke 61 are opposite to the center points of the poles of the rotor. In this position, no reluctance torque is applied to the rotor. This position corresponds to points 66, 66', respectively, shown in FIG. 6 of the torque distribution curve. FIG. 6 illustrates the distribution of the reluctance torque over an angle of rotation $\Phi$, for the arrangement illustrated in FIG. 3.

A certain torque is required (neglecting friction) to move the rotor from the position of FIG. 3 in the direction of the arrow 64. This torque, due to the shape of the magnetization of the rotor (curve B, FIG. 3, graph a) is, initially, only very small since the flux in the yoke 61 hardly changes. When, however, the rotor has reached the position indicated in FIG. 4, in which the pole gaps 65 approach the ends 62, 63 of the yoke 61, flux in the yoke 61 drops rapidly. The required torque to continue to move the rotor then increases rapidly to a maximum — see curve portion 67, FIG. 6.

In the position of the rotor illustrated in FIG. 5, the torque again becomes zero. This is a position in which the yoke is equally attracted by both poles N, S of the rotor, that is, the yoke 61 is exactly between the poles. This is an unstabled position of equilibrium. If the rotor should stop at exactly this position, the slightest jarring will cause the rotor to move in one or the other direction to assume the position of FIG. 3, graph b. The position of the rotor in the unstable equilibrium, illustrated in FIG. 5, corresponds to the point 68 in FIG. 6. Usually the rotor would not stop in this unstable position of equilibrium; it might, however, do so if there is some defect or contamination in the bearings, so that undue friction might arise to prevent movement of the rotor, even upon jarring, or upon slight displacement out of the position of equilibrium. Under actual operating conditions, and for a properly operating motor, it is unlikely that the rotor will stop, and remain at the unstable position of equilibrium.

Figure 5:
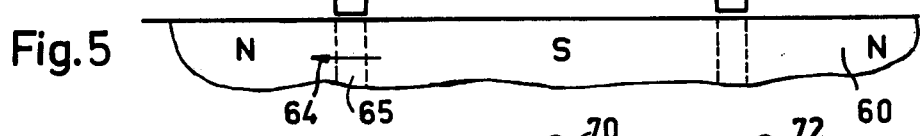

If the rotor is moved from the unstable equilibrium position, FIG. 5, in the direction of the arrow 64, then a driving torque will be delivered by the rotor. Due to the symmetry of the arrangement, the torque distribution will be the mirror image of the torque between points 66, 67, 68. The derived, driving torque obtained from the motor is shown at 70 in FIG. 6, whereas the braking torque due to movement of the rotor, that is, the torque which must be supplied to move the rotor from position 66 to position 68 is shown by the curve portion 69 in FIG. 6.

The torque distribution, that is, the shape of the torque curve in FIG. 6, as well as the phasing of the curve depends highly on the shape of the magnetization curve of the rotor poles, assuming the same shape of the yoke 61. If the magnetization would be highly concentrated, for example would have the shape illustrated by the chain dotted curve B', FIG. 3, graph a, then the torque distribution as shown in FIG. 6 would have the shape illustrated by chain dotted curve 72, in which the reluctance torque is indicated at $M'_{rel}$.

The stable and unstable equilibrium points 66, 66' and 68 of curve 69, 70 are common with the stable, and unstable positions of equilibrium of curve 72. Extending, or shortening the yoke 61 also changes the shape and the amplitude of the reluctance torque.

The torque distribution, as represented by the torque curves in FIG. 6 is not favorable, since the maxima (positive and negative) are closely adjacent each other, and are of approximately equal amplitude. By broadening the ends 62, 63 of the yoke 61, the maxima can be broadened; the general shape of the curve, however, in which two oppositely polarized maxima are closely adjacent, and connected by a long portion of low amplitude, does not change. An isometrical torque distribution can be obtained by changing the shape of the yoke. FIGS. 7, 7a and 9 illustrate arrangements which result in asymmetrical torque distribution. For purposes of explanation, an idealized torque curve will be referred to; such an idealized torque curve is indicated by curve 74, in broken lines, in FIG. 6, as an idealized, square-wave approximation of the torque peaks 69, 70 there shown. FIGS. 7, 7a and 9 again illustrate, in developed form, a rotor magnet, and yoke, in developed representation.

Embodiment of FIG. 7: The direction of rotation, as indicated by arrow 78 is reversed with respect to that shown in FIGS. 3–6. The yoke 76, as well as the rotor 77 are shown developed; the pole gaps are illustrated by broken lines 79. Magnetization is trapezoidal, corresponding to curve B of FIG. 3. The rotor 77 is polarized perpendicularly to the plane of the drawing, that is, the yoke 76 interacts with the stray or leakage field of the rotor.

The side of rotor 77 which faces the yoke 76 is stepped; it increases, in steps, starting from a narrow zone or step 81, counter the direction of rotation, in small steps 82, extending over a substantial range 83, at an average slope approximated by angle $\alpha$; looked at in the direction of rotation, a single substantial step 84, extending over a short range 85, at an average slope of angle $\beta$ forms a zone of increased of distance between rotor 77 and yoke 76. These steps, as shown, are provided for purposes of explanation. In actual practice, the face of the yoke may well be smoothly tapered, as shown in FIG. 1, receding from the narrowest point 81 over zones 83, 85 at the respective angles of taper. The length of the zones 83, 85, as well as the inclination of the angle $\alpha$ and $\beta$ can be fitted to match desired torque relationships and requirements.

The yoke 76, the left section of which is identical to the right (see FIG. 7) can be thought of as consisting of five separate and superimposed yoke elements, in which the effects of the yoke elements are also superimposed, or combined, as indicated in FIG. 7a at 76'. Each one of the yoke elements then will generate a torque in the form of the torque 74 (FIG. 6) when two adjacent pole gaps 69 move past the ends of the yokes. The amplitude of this torque will depend on the size of the relevant air gap.

The first yoke 88 (FIG. 7a) will generate a relatively small torque 88', FIG. 8, graph a; the second yoke 89 will generate a somewhat larger torque 89', FIG. 8, graph b, which is phase shifted or offset with respect to torque 88', and so on for all the yokes 90, 91, 92 which generate corresponding torques 90', 91', 92' as seen in graphs c to e of FIG. 8. Adding all these torques, the desired asymmetrical reluctance torque 93 seen in FIG. 8, graph f is obtained; the braking portion if there indicated below the line, that is, as a negative torque, and the driving torque is indicated at the positive side. A similar torque distribution will be obtained from a single yoke 76, as seen in FIG. 7, which, magnetically, is identical with the yoke 76' of FIG. 7a.

The notch 80, illustrated in FIG. 7 formed in the yoke is desirable since it facilitates mounting of the yoke structure on the stator; this notch 80 is not, however, necessary for the magnetic operation of the yoke 76.

The torque distribution as seen in curve 93 of the magnetic reluctance torque $M_{rel}$, FIG. 8, graph f, is shown in idealized form, and is, in actual practice not obtained; as illustrated in curve 93, the curve is a mathematical abstraction. In actual practice, the curve distribution which will be obtained is that shown in FIG. 11 at $M_{rel}$. Point 94 corresponds to the stable position of equilibrium, corresponding to point 66 in FIG. 6, and illustrated in the position of the rotor in FIG. 1. Point 95 is the unstable position of equilibrium. If motor 10 is deenergized, the rotor will turn until it reaches the stable position of equilibrium, at 94. Upon connection of the motor to a current source, an electromagnetic drive torque $M_{el}$ (FIG. 11) will become effective, which is strong enough to overcome the braking portion 96 of the reluctance torque $M_{el}$, and thus stores magnetic energy in the motor. This magnetic energy is released as a driving reluctance torque 43 during the torque gap 44 (FIG. 11, graph a) in the commutation interval when the coils 20–20 (FIG. 1) do not carry current. Super-imposing the electrodynamic torque $M_{el}$, FIG. 11, and the magnetic reluctance torque $M_{rel}$, FIG. 11, a substantially constant, even overall torque $M_{ges}$, as shown by curve 97 in FIG. 11, graph c is obtained. This torque 97 is the one which is available at the output shaft 30 of the motor. The torque distribution, that is, the even or straight line is programmed into the motor construction by the aforementioned parameters, that is, the magnetization or distribution of magnetization of the ring magnet 34, the number and shape of the yokes 40, 41, 42, the distance of the yokes from the magnet 34, the position of the yokes relative to the windings, and the instantaneous circumferential position of the yoke with respect to the circumference of the magnet 34, that is, the extent of the angles α and β, and the extent of the zones 83, 85 (FIG. 7).

Embodiment of FIG. 9: A yoke 101, having a central blotch 101', corresponding to notch 80 in yoke 76 (FIG. 7) interacts with a rotor 102, moving in the direction of the arrow 103. Again, the representation is shown in developed view. The rotor has magnetic poles, magnetized essentially in accordance with the curve B of FIG. 3, graph a, and has pole gaps 104 between the rotor poles.

The yoke 101 has a comparatively short region or zone 105 — in contrast to the yoke 76 of FIG. 7 — in which the air gap decreases at a substantially high rate over an angle γ, that is, the angle γ is comparatively steep. The air gap then increases over a substantially long region 106 in accordance with an average angle δ, angle δ being smaller than the angle γ. Again, and for better illustration, the ends of the yoke 101 are illustrated as having discrete steps. In analogy to FIG. 7a, the yoke may, therefore, again be considered to consist of five separate yoke elements which, each, generate phase-shifted torques 107-111 (FIG. 10, graphs a-e). These torques 107-111 form a sum torque, $\Sigma M$, seen at curve 112, graph f of FIG. 10. This torque distribution shows a high braking torque for a short time and a comparatively weak driving torque which extends over a comparatively long region or zone. This type of torque distribution is particularly suitable for motors in accordance with the present invention, in which speed control is effected by changing the time of current flow through the windings, that is, by changing the angle of current flow (with respect to electrical degrees of rotor rotation passed the windings). The driving, electrodynamic torque is made to be generally effective only during a duration of about 90°el (electrical) at nominal speed. This provides for optimum efficiency, and can be considered comparable to the 90° commutation in the brushless motors described in the literature above referred to.

The general construction of a speed control circuit is illustrated in FIG. 14, applied to the motor 10 of FIG. 1. Resistor 55 of FIG. 1 is replaced by the collector-emitter path of a ntn transistor 114, serially connected with a resistor 115 (FIG. 14). The terminals A and E' are connected to the anodes of two diodes 116, 117; the cathodes of the diodes 116, 117 are jointly connected to a junction or line 118 which is connected over a potentiometer 119 with positive bus 57.

The tap point or slider 120 of potentiometer 119 is connected to a control input of a speed controller 123, the output of which is connected to the base of transistor 114. The conduction of transistor 114 is so controlled by the controller 123 that the current flowing to the Hall generator 37 is controlled thereby. The Hall generator 37, thus, effectively operates like an AND gate, since it connects either one of the transistors 53, or 54 only if (1) a signal is provided by the controller 123, and (2) Hall generator 37 is subjected to a corresponding magnetic field from the ring magnet 34. For a detailed disclosure of controller 123, reference is made to the above referred to copending application assigned to the assignee of the present invention. It may, for example, contain a circuit arrangement in which the voltage taken off the tap point or slider 120 is compared with a reference to provide an output control signal to the base of transistor 114.

Operation, with reference to FIG. 15: Graph a of FIG. 15 shows the voltage $u_{120}$ at the slider 120 of potentiometer 119. The output from controller 123 is in the form of pulses 124, schematically shown in FIG. 14, which have maxima in phase with the maxima of the voltage $u_{120}$. The width of these pulses is controlled by the controller 123. If the speed of the motor is too low, the width is increased; if the speed is too high, the pulses 124 are narrowed. At nominal speed, currents $i_{53}$ and $i_{54}$ will flow through the transistors 53, 54, respectively, generating, accordingly, an electrodynamic drive torque $M_{el}$ in pulses 126, 127 which have a duration of only about 60° el, and are in phase with the voltage $u_{120}$. This provides for excellent efficiency of operation of the motor. The duration of current flow, which may be referred to as the flow angle $\epsilon$, that is, the angle (with reference to electrical degrees) during which the current $i_{53}$ or $i_{54}$ flows is determined by the width of the pulses 124 (FIG. 14), and thus also determines the width of the pulses 126, 127 of the electrodynamic drive torque. If the motor is operating at a speed which is too low, the torque is effective during a greater angular range; if the speed is too high, however, the torque is effective during a shorter angular range. The magnetic relationships of the yoke, or yokes, with respect to the rotor of the motor are so arranged that the resulting reluctance torque distribution essentially balances the electrodynamic torque at nominal speed of the motor.

The controller 123 need not be described in detail at this point, since controllers of this type are disclosed in applications assigned to the assignee of the present application to which reference is made of Ser. No. 408,781, Oct. 23, 1973, now U.S. Pat. No. 3,906,320, Doemen; Ser. No. 363,291, filed May 23, 1973, now U.S. Pat. No. 3,840,761, Muller; Ser. No. 451,869, filed Mar. 18, 1973, now U.S. Pat. No. 3,932,793, Muller; and Ser. No. 363,290, filed May 23, 1973, now U.S. Pat. No. 3,873,897, Muller.

The magnetic reluctance torque curve of graph c of FIG. 15, which is the approximate mirror image of the electrodynamic torques $M_{el}$ shown at curves 126, 127 has approximately the shape of the torque curve 112 of FIG. 10. A motor with the control circuit in accordance with FIG. 14 does not have yokes 40, 41, 42 (FIG. 1) which have approximately the shape of the yoke illustrated in FIG. 9.

The present invention is not limited to pancake-type, or axial air gap motors, but may be used also with radial, that is, cylindrical air gap motors. Referring to FIGS. 12 and 13: A radially magnetized permanent magnet rotor 130, schematically shown only, is located within a stator structure 131, only shown schematically. Mechanical components of the stator structure, bearings, and the like may be standard and have been omitted for clarity of illustration. The motor may have a cylindrical air gap 132 of uniform widths, or the cylindrical air gap may be non-uniform, as disclosed in application Ser. No. 363,290, May 23, 1973, now U.S. Pat. No. 3,873,897 assigned to the assignee of the present application.

Yoke 133, 134 of material having soft-iron characteristics are located at the axial ends of the rotor 130 in such a manner that they interact with the stray or leakage magnetic field of the rotor 130, to generate a reluctance torque, as described. These yokes are only schematically shown in FIGS. 12, 13 and are suitably constructed similarly to the yokes described in connection with FIGS. 7 and 9, the specific shape given to the yokes depending on the specific torque distribution desired. This shape will also depend to some extent on whether the motor is designed to operate with a speed controller or to operate over a rather wide range of speed and load.

Material suitable for the yokes is, generally, soft-iron or other suitable material having soft-iron characteristics. The yokes need not be separate elements, as shown in FIG. 1; the yokes may also be strips which are continuous, or discontinuous of material having soft-iron characteristics, such as soft-iron sheet metal, or the like. FIGS. 16, 17 illustrate an axial air gap motor 140 which generally is constructed similarly to the motor 10 of FIGS. 1 and 2.

Embodiment of FIGS. 16, 17: A ring 142 made of soft-iron sheet material is secured to the stator plate 12 that it essentially extends concentric with respect to the magnetic rotor 34. Ring 142 which may, for example, be formed of a bent strip of soft-iron sheet metal is shaped to provide six radially inwardly directed projecting zones 143, separated from each other by the distance of one pole gap, each, the projecting zones 143 interacting with the stray or leakage field of the magnetic rotor structure 34, as above described, to generate a reluctance torque. The distance a, FIG. 16, between the projections 143 and the magnet rotor 34 can be adjusted, for example by bending, by the use of a die, or the like. After adjustment, ring 142 is suitably fixed in adjusted position. This fixing in adjusted position may be obtained, for example, by adhesives, upsetting and clamping attachment prongs punched from the ring 142 (not shown) engaging, for example, stator plate 12, or the like. The projecting zones 143 may have a suitable shape, corresponding, for example, to the shapes of the yokes shown in FIG. 7, and FIG. 9. Such suitable shapes can be readily formed by rolling of a soft-iron metal strip.

The yokes, strips, or otherwise formed elements having soft-iron characteristics may be single unitary elements, or may be multiple elements; they may be offset with respect to each other so that, by interaction of the magnetic fields in various ones of these elements, a desired distribution of the reluctance torque, with respect to angular position of the rotor, as it rotates, is obtained. It is, for example, possible to stack variously shaped soft iron elements of different shape above each other, and secure them together, for example by riveting, in order to obtain a desired torque distribution. If the particular motor housing, or the appliance to be driven by the motor already has components, which are made for example of soft-iron sheet metal, then such sheet metal elements may be utilized for the purposes of the present invention by bending suitable flaps from the remainder of the motor structure, or the other structure to which it is connected, and to shape these flaps so that they are suitable to generate the desired reluctance torque. Many possibilities of design present themselves in order to obtain a motor of low cost which can be easily and simply manufactured and assembled to the driven unit, and reliably, and reproducibly generate the design torque with essentially uniform torque distribution at design speeds.

Embodiment of FIGS. 18–20: A four-pole brushless motor 210, has a stator 211 secured on an insulating plate 212. The motor is enclosed by a ferromagnetic motor housing 213. Plate 212 carries a printed circuit (not shown) with the electronic switching elements of the motor 210. The plate 212 is formed with two openings 215, 216, in which core-less flat coils 220, 221, respectively are secured by adhesives. The shape of coils 220, 221 is seen in FIG. 19. The coils 220, 221 are mechanically offset by a 180°, corresponding to 360° el. Shaft 230 penetrates centrally through plate 212, and is secured in bearings 229, 229' within housing 213. A spacer sleeve 231 accurately maintains two soft-iron discs 232, 233 spaced from each other, disc 232 having a four-pole axially magnetized ring magnet 234 adhered thereon. The pole gaps extend radially. These several poles of ring magnet 234 are indicated, as customary, by letters N and S. The flux distribution of the ring magnet 234, in developed form, is generally trapezoidal, and similar to curve B, FIG. 3. The soft-iron disc 233 rotates with the shaft and closes the magnetic circuit. Coils 220, 221 are located in the air gap 236.

Two soft-iron sheet metal elements 241, 242 are secured within housing 213 by means of rivets 243, 244 to the inner circumference thereof. The soft-iron elements 241, 242 are 360° electrically offset with respect to each other. They are identical, so that description of element 241 suffices and is equally applicable to element 242. Element 241 has a first portion 245 which closely fits the inner surface of the housing. It is then followed by a further section or zone 246 which is somewhat springy and which permits movement of the soft-iron element 241 with respect to the housing 213, and thus with respect to the outer circumference 247 of magnet 234. The soft-iron element 241 then is formed to have a zone 248 in which the effective distance between element 241 and the circumference 247 of the rotor 234 rapidly decreases. This rapidly decreasing zone extends over an annular range α — looked at in the direction of rotation 249. Subsequent to the rapidly decreasing range 248 of strip 41 follows the free end of the soft-rion element in zone 250, extending over an annular range β. The zone or portion 250 is so shaped that the radial distance — looked at in the direction of rotation — from the rotor increases gradually and slowly.

A screw 253 engages the free end of the zone 250 of the strip 241. Screw 253 acts as an adjustment element; by rotating the screw in a suitable tap or threaded hole in the housing 213, the distance between the strip 241 and the circumference 247 of the rotor can be increased or decreased. If the distance from the rotor is increased, the reluctance torque is decreased; upon decreasing the distance, that is, the gap between the soft-iron strip 241 and the circumference 247 of the rotor, the reluctance torque increases. An adjustment screw 254 similarly adjust the position of the strip 242. Preferably, adjustment of strips 241, 242 is done in the same direction for both strips, in order to prevent any unsymmetrical forces on the rotor magnet 234, that is, to prevent unilaterally acting radial unbalanced forces acting on the rotor.

The detailed construction shown in FIG. 20 is even better suited for some applications, since the soft-iron strip 260 is held at both ends by means of rivets 261, 262 on the housing 213. Adjustment screw 263, as above explained, provides for adjustment and deformation of the strip 260. The type of deformation of the strip is slightly different from that of the strips 241, 242, FIGS. 18, 19. The arrangement in accordance with FIG. 20 has the advantage that the strip 260 cannot be subjected to undesired vibrations or oscillations at its free end. The provision of adjustment screws 253, 254 (FIGS. 18, 19) and 263, (FIG. 20) is not the invention of the Inventor of the present application but that of the Inventor's Co-Worker Dr. Muller. No claim is mader herein specifically to adjustment by screws, as shown.

Both of the foregoing examples (FIGS. 18 and 19; FIG. 20) may provide a separate soft-iron strip for each pole of the rotor magnet. Smaller reluctance torques may, however, be generated with a lower number of strips; for example, as shown, two strips 241, 242 may be suitable for cooperation with a four-pole permanent magnet rotor. The arrangement of FIG. 20 may, of course, be applied at various circumferential positions of the housing 230, and, especially, duplicated symmetrically at the circumference of the housing 213, to provide for accurate adjustment of the reluctance torque, and to prevent radial unbalance forces acting on the rotor.

Various changes and modifications may be made within the scope of the inventive concept and features described in connection with any one embodiment may, within the invention, apply to any other of the embodiments.

The elements 40–42 may be located for example to face the inside circumference of ring magnet 34.

I claim:

1. In a brushless, permanent magnet rotor motor having a stator structure (12) including winding means (20, 21, 22; 220, 221) which, when energized, generate an electromagnetic field;
a permanent magnet rotor (34, 130, 234);
means (32, 33) forming a direct magnetic circuit including the winding means, the rotor, and an air gap, the rotor being journalled and located such that the magnetic field from the rotor in the magnetic circuit interacts with the electromagnetic field from the stator winding means;
means (37, 53, 54) periodically energizing the winding means as a function of rotor position to provide the electromagnetic field and cause an electrodynamic driving torque ($M_{el}$) to be applied to the rotor, said driving torque being interrupted during gaps of energization of the stator;
and ferromagnetic means (40, 41, 42; 61; 76; 101; 133, 134; 142; 241, 242; 260) having soft-iron characteristics, stationary with respect to the rotor, said ferromagnetic means generating, during operation, an additional torque ($M_{rel}$) effective as a positive driving torque during the gaps of generation of the electrodynamic driving torque ($M_{el}$) due to the gaps of energization of the said winding means, said soft-iron ferromagnetic means being shaped, and located with respect to the location of the winding means such that additional torque ($M_{rel}$) produced thereby during operation is substantially in phase opposition to the alternating component of the torque ($M_{el}$) caused by energization of the winding means;
the improvement wherein
said ferromagnetic means are positioned to have at least a portion of its volume located outside of the direct magnetic circuit, outside the air gap and within the range of the stray, or leakage flux field from the permanent magnet rotor (34, 130, 234).

2. Motor according to claim 1, wherein the ferromagnetic means comprises
at least one ferromagnetic element extending over an angular range adjacent the rotor and encompassing an angle of at least about one pole width.

3. Motor according to claim 1, wherein the ferromagnetic means comprises at least one ferromagnetic yoke which is located to interact with the stray or leakage flux from the rotor.

4. Motor according to claim 3, wherein the yoke is generally U-shaped.

5. Motor according to claim 3, wherein the magnetically effective distance $a$ of at least a portion of the yoke, from the rotor is adjustable.

6. Motor according to claim 3, wherein the yoke is shaped, over the angular extent — with respect to the rotor, and with respect to the direction of rotation of the rotor — such that the effective distance of the end portion thereof interacting with the stray or leakage flux from the rotor varies over said angular extent.

7. Motor according to claim 6, wherein the yoke has a zone or portion (52, 84, 106) in which the distance of the end portion with respect to the rotor increases from a minimum (51) distance.

8. Motor according to claim 7, wherein the yoke had a zone or portion (38, 78, 103) in which the distance of the end portion of the yoke with respect to the rotor decreases to said minimum.

9. Motor according to claim 8, wherein the increasing zone or portion (52, 84, 106) is greater than the decreasing zone or portion (38, 78, 103).

10. Motor according to claim 8, wherein the means periodically energizing the winding means provide energization pulses having a pulse length of between about 60° to 130° el; and wherein the angle δ of increased of said distance is less than the angle γ of decrease of said distance.

11. Motor according to claim 8, wherein the means periodically energizing the winding means provide energization pulses having a pulse length of between 120° to 180° el;

and wherein the angle β of increase of said distance is greater than the angle α of decrease of the distance.

12. Motor according to claim 1, wherein the ferromagnetic means comprises a plurality of ferromagnetic elements (40, 41, 42; 133; 241, 242; 260) located circumferentially around the rotor, within the stray or leakage field therefrom.

13. Motor according to claim 1, wherein the ferromagnetic means comprises (FIG. 7a) a plurality of ferromagnetic elements located adjacent each other and circumferentially offset with respect to each other to generate (FIG. 8), each, a reluctance torque ($M_{rel}$) which is phase shifted with respect to the reluctance torque of the next adjacent element.

14. Motor according to claim 12, wherein the ferromagnetic elements are located on the stator to define a start position (66; 94) of the rotor.

15. Motor according to claim 1, wherein the motor is an axial air gap motor;

the winding means comprises core-less stator windings (20, 21, 22; 220, 221) and the rotor comprises at least one axially polarized rotating magnet ring (34, 234);

and the ferromagnetic means comprises at least one ferromagnetic element (40, 41, 42; 241, 242; 260) located on the stator adjacent a circumferential surface of the magnet ring.

16. Motor according to claim 15, wherein the ferromagnetic element is located adjacent the outer circumferential surface of the magnet ring.

17. Motor according to claim 15, wherein the stator structure comprises support means (12) securing the stator winding means in position with respect to the rotor;

and wherein the ferromagnetic element, or elements is, or are secured to said support means.

18. Motor according to claim 17, wherein said support means (12) is formed with at least one recess (46), the ferromagnetic element (40) being located in said recess and secured therein and spaced from the rotor by a predetermined distance.

19. Motor according to claim 18, wherein said ferromagnetic element (40) is secured in the recess by an adhesive (47).

20. Motor according to claim 15, wherein the magnet ring of the permanent magnet rotor (34) has poles magnetized approximately trapezoidally (FIG. 3, curve B).

21. Motor according to claim 15, wherein the magnet ring has poles which are spaced from each other by pole gaps (35), the pole gaps extending approximately radially.

22. Motor according to claim 21, wherein the winding means comprises magnetically active portions (23, 24) extending approximately radially with respect to the axes of the motor shaft (30).

23. Motor according to claim 22, wherein the means periodically energizing the winding means comprises a commutating sensor (37) located within the magnetically active range of a stator winding (22).

24. Motor according to claim 23, wherein the commutating sensor is located on the stator winding.

25. Motor according to claim 15, wherein (FIG. 16) the ferromagnetic element comprises an elongated strip (142) extending over a plurality of pole subdivisions of the rotor, substantially parallel to a circumference of the magnet ring (34) and being formed with radially directed projections (143) extending towards the rotor circumference.

26. Motor according to claim 25, wherein the projections (143) are spaced from each other by a distance of approximately one pole subdivision.

27. Motor according to claim 25, wherein the soft-iron strip is a continuous ring (142) located substantially concentrically with respect to the magnet ring (34) of the rotor and having a minimum spacing therefrom $a$ between the furtherest extent of said projections (143) and the rotor ring (34).

28. Motor according to claim 1, wherein the motor is a radial air gap motor (FIGS. 12, 13) having a radially polarized permanent magnet rotor (130);

and the ferromagnetic means comprises at least one ferromagnetic yoke (133, 134) located adjacent at least one of the end faces of the rotor (130) and within the stray or leakage field of the rotor.

29. Motor according to claim 1, wherein the ferromagnetic means comprises soft-iron strip material (40, 41, 42; 143; 241, 242, 260) the distance $a$ of which is adjustable with respect to the rotor magnet (34, 130, 234).

30. Motor according to claim 29, wherein the soft-iron strip material comprises soft-iron sheet material (142, 143; 241, 242, 260), the distance $a$ between said sheet material and the rotor magnet being adjustable by bending said sheet strip material.

31. Motor according to claim 29, further comprising means (47) to lock the strip material in fixed position with respect to the circumference of the rotor.

32. Motor according to claim 1, wherein the ferromagnetic means comprises a plurality of elements having soft-iron characteristics, located circumferentially around the rotor, and symmetrical with respect to the axis of the rotor shaft to balance attractive forces arising between the rotor and said elements and to prevent unbalanced forces from being transferred to bearings for the rotor shaft.

33. In a brushless permanent magnet rotor motor having a stator structure (12) including winding means (20, 21, 22; 220, 221) which, when energized, generates an electromagnetic field;
a permanent magnet rotor (34, 130, 234) journalled and located such that its magnetic field interacts with the magnetic field of the stator winding means;
an air gap between the rotor and the stator structure;
means (37, 53, 54) periodically energizing the winding means as a function of rotor position to provide an electromagnetic field and to cause an electrodynamic driving torque ($M_{el}$) to be applied to the rotor, said driving torque being interrupted during gaps of energization of the stator and being composed of a constant driving torque component and an alternating driving torque component, superimposed on said constant driving torque component;
means generating an alternating torque ($M_{rel}$) operative substantially in counter phase to the alternating torque component of the driving torque ($M_{el}$) to provide a positive driving torque substantially effective during the gaps of energization of the winding means, comprising
at least one element of ferromagnetic material having soft-iron characteristics located on the stator outside of said air gap and in position to interact with the stray, or magnetic flux from the permanent magnet rotor and extending over an angular range of the rotor at least about a major extent of the distance between pole gaps thereof and spaced from the rotor by a varying distance over said angular range, approaching to rotor to reach a minimum spacing, and then receding therefrom.

34. In the motor of claim 33, said ferromagnetic element comprising a strip-shaped means of soft-iron sheet material bent in asymmetrical, generally shallow U-shaped, with the bend of the U facing the rotor and spaced therefrom by said minimum spacing.

35. In the motor of claim 34, means securing said sheet material in spaced, adjusted position on the stator with respect to the rotor.

36. Motor according to claim 1, wherein the permanent magnet rotor comprises a ring magnet;
and wherein the permanent magnet means comprises at least one ferromagnetic element extending over an angular range and located adjacent the rotor to face the inside circumference of the ring magnet rotor.

37. Motor according to claim 33, wherein the motor is an axial air gap motor;
the rotor comprises a ring magnet, and the element of ferromagnetic material is located on the stator to face the inside circumference of the ring magnet rotor.

38. Motor according to claim 1, wherein the ferromagnetic means (260) having soft iron characteristics comprises at least one ferromagnetic element forming a chord with respect to a cylindrical portion of the stator.

* * * * *